Oct. 6, 1931.  A. M. HENRY  1,825,792
AIRPLANE
Filed June 5, 1929  3 Sheets-Sheet 2

Inventor:
Augustus M. Henry,
By his Attorney
Frank H. Kent

Oct. 6, 1931.  A. M. HENRY  1,825,792
AIRPLANE
Filed June 5, 1929  3 Sheets-Sheet 3

Inventor:
Augustus M. Henry,
By his Attorney
Frank H. Kent

Patented Oct. 6, 1931

1,825,792

UNITED STATES PATENT OFFICE

AUGUSTUS M. HENRY, OF BROOKLYN, NEW YORK, ASSIGNOR OF THIRTY PER CENT TO FRANK J. KENT, OF MONTCLAIR, NEW JERSEY

AIRPLANE

Application filed June 5, 1929. Serial No. 368,474.

This invention relates to airplanes.

The main object is to provide an airplane safer for human occupants than heretofore, because the airplane will, pursuant to a lesson taken at least in part from motor-car design, be so constructed or equipped as to incorporate therein one or more projecting or protectant, flight-componental or auxiliary, structures or elements, adapted to act in an emergency as shock-absorbing "fenders" relative to the ground or other object abnormally impacted or collided with.

Each such fender employed will, pursuant to the invention, be in some fashion or other, and at or prior to the moment of impact, presented between the occupant-housing part of the airplane and the object approaching collision therewith, as a crumpleable, crushable or deformable entity. The object is to have such entity, act, by its crumpling, crushing or distortion at the moment of collision, to absorb all or enough of the force of a violent or otherwise abnormal impact to insure, to a greater degree than heretofore, if not absolutely, the safety of crew and passengers. The provision of such a safety factor as just described, even at the cost possibly of injuring the airplane beyond repair on certain exceptional and rarely occurring emergencies, will obviously constitute a means for widely popularizing air-travel and consequently for hastening the advance of aviation to the dominant position in transportation it will ultimately in any event attain.

Heavier-than-air flying machines, or airplanes, are today recognized by pilots, and those otherwise experienced in flying, to be of a high degree of dependability while in flight, due to a multitude of improvements of a technical character. The public imagination, however, is not so much concerned with questions of dihedral angle, wing-slot and self-stabilization, as it is with recollections of fuselage-smashing and life-taking landings, and other accidents where the dangers arose from collision or impact occurring after a safe volplaning or other descent to a very low height or after an imperfect ascent to such a low height. Examples of destructive landings have been numerous in the daily press. Pancake landings have occurred, sometimes the result of a momentary skill-failure of the pilot, sometimes deliberately chanced, as where a take-off meets with unexpected difficulty and pancaking must follow to avoid a greater peril. Again, the loss of a part of the landing gear, or other defects, structural or human, have resulted in such imperfect landings as to cause fuselage crushing, sometimes incident to nose or tail dives against the ground, and fuselage or wing impacts against solid objects such as trees, stone-walls, freight cars, buildings, etc. A frequent cause of loss of life has been the rigid mounting of the engine at the front of the fuselage, especially destructive in nose-crashes.

An important aim of the invention is to obviate many if not all of the dangers to human life and limb arising from an abnormal impact of an airplane against another object, such impacts, for instance, as those just enumerated.

The fender entities of the present invention may be, for example, at one or more of the following locations, as well as others: the wing-tips; the fuselage tail-portion; the fuselage fore-portion, preferably between the engine and the pilot's station; the bottom of the fuselage underlying the passenger compartment or equivalent; the sides of the fuselage beyond the protecting scope of the wing-tip fenders if the latter are incorporated, or otherwise along the fuselage sides. Such a fender may even be located along the fuselage top, in readiness to protect life according to the invention even where such an unlikely event occurs as the collision of the airplane with earth, water or any other object while the airplane is flying or dropping inverted.

The illustrative embodiment shown in the drawings includes fender entities in all the locations just now mentioned.

According to the invention, either or both of what may be called terminal and intermediate fenders may be employed. A terminal fender is one so constructed as ordinarily or in normal flight to be rigidified to the required strength by auxiliary braces or the like, with such braces or the like quickly rendered inoperative on the approach of an emergency, thereby to establish the remaining structural elements as the crumpleable, crushable or distortable entity hereinabove referred to. An intermediate fender is one so constructed as ordinarily or in normal flight to be housed or collapsed in such manner as not to interfere materially with the aerodynamic efficiency of the airplane as a whole, yet capable of being quickly extended or projected, say expanded from a collapsed condition, away from the airplane on the approach of an emergency.

Pursuant to such a way of carrying out the invention, and in accordance with present preference, one of said terminal fenders will be a mounting means for the engine; another of said terminal fenders will be a mounting means for the tail and elevator carrying after-section of the fuselage; and others of said terminal fenders will be inbuilt at the wing-tips.

Thus by the expression "terminal fender" is meant a fender always projectant in a protective manner from at or near a terminal or end portion of an otherwise present component of an airplane, such as the fuselage or a wing thereof. By the expression "intermediate fender" is meant a fender not constituting or participating in the upbuilding structurally of such a component of the airplane, or a fender not normally projectant at all, or a fender located intermediate the termini of a structural component of the airplane.

Also, according to the invention, preferably, power-means are relied on for rendering inoperative the braces or the like normally fortifying to flying-strength the one or more terminal fenders employed, and also for expanding or otherwise rendering protectingly-operative the one or more intermediate fenders employed.

The invention will be more clearly understood, and various other advantages thereof will be appreciated, from the following detailed description of one of the many possible embodiments thereof which is illustrated in the drawings aforesaid, wherein like characters of reference refer to like parts.

Referring to Figs. 1, 4, 5 and 9, wherein as most facilitative of a simple disclosure of the invention a monoplane of the fat-wing type is illustrated, the wings are indicated at 14 and 15, the main body of the fuselage at 16, the engine at 17, the propeller at 18, and the after-portion of the fuselage at 19, the component last-mentioned carrying direction-controlling surfaces or airfoils indicated generally at 20.

The landing gear (Fig. 5) is indicated generally at 21, chiefly by the location of the wheels 22.

No attempt is made to illustrate structural details of the ordinary componental structures of an airplane, except where they form parts of or are of particular interest in relation to the fenders or their operating means. Thus, since it will aid to an understanding of the principles of the invention, the sheathing or skin of the fuselage and wing parts is shown in dot and dash lines, but is not given a reference character except where specifically having to be referred to, as in Figs. 6 and 7, where such skin or sheathing is marked S. Certain fuselage longérons are shown, of exaggerated size in Fig. 4, and merely diagrammatically in Fig. 1, but in both instances given the reference character 23. Similarly, certain wing spars are shown, of exaggerated size in Fig. 4, merely diagrammatically in Fig. 1, and more or less according to standard design in Figs. 2 and 3, but in all three instances given the reference character 23.

Figures 1, 1A, 2, 3:
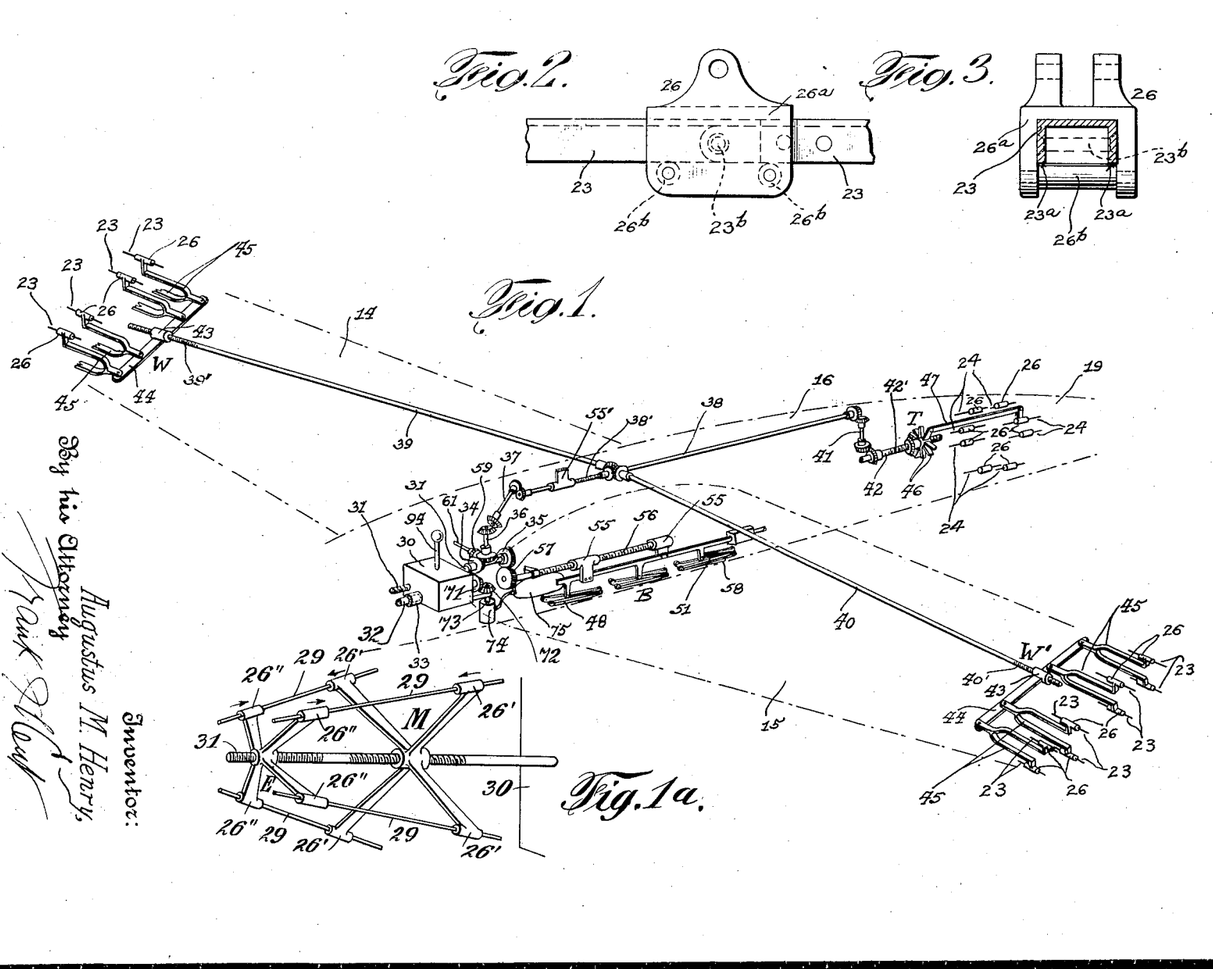
Fig. 1 is a schematic perspective view illustrating in full lines various operating parts of the new safety apparatus, parts of the airplane itself being shown in dot and dash lines.
Fig. 1a, on a slightly larger scale but also schematically in perspective, shows, properly prolonged, the screw-shaft at the extreme left in Fig. 1, and various parts operated thereby.
Fig. 2 is a detail view showing in side elevation a plurality of elements as shown diagrammatically in Fig. 1.
Fig. 3 is an end elevation, looking to the right in Fig. 2.
Figures 4, 4A:
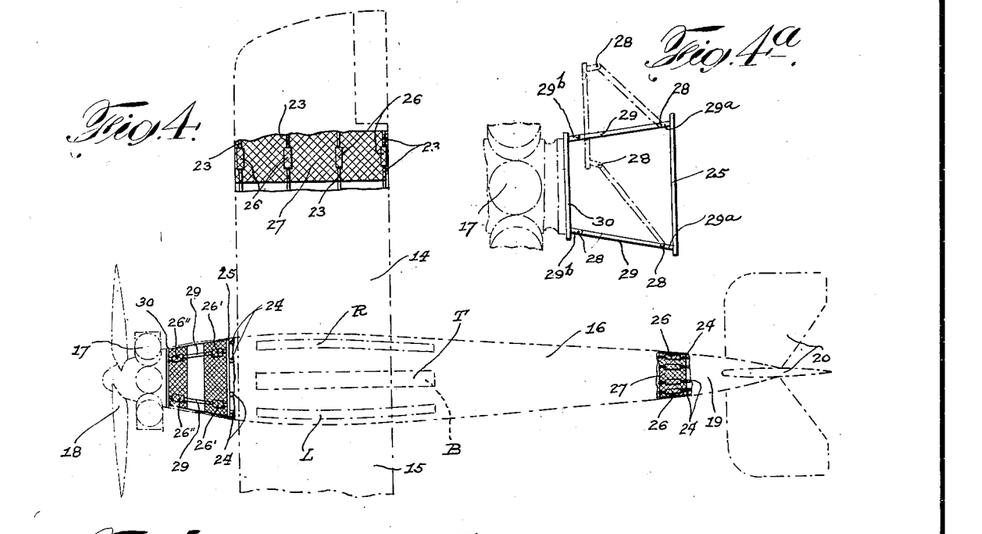
Fig. 4 shows in top plan an airplane equipped with terminal and intermediate fenders pursuant to the invention, the terminal fenders including withdrawable braces of the type illustrated in Fig. 1.
Fig. 4a is a detail view, showing in side elevation important elements of the engine-mounting terminal fender of Fig. 4, said elements being shown in broken lines as thrust to abnormal locations to move the engine relative to the fuselage yet not to crush in the fore-part of the latter.

From a cross-checking of the reference characters 24 as they appear in Figs. 1 and 4, it will be noted that for convenience of disclosure and description, each wing is provided merely with four upper spars and four lower spars 24. This will be seen best from the lower or right hand end portion of Fig. 1; as the two wings are assumed of identical construction, that is, certain parts at the upper or left hand end portion of Fig. 1, are only fragmentarily shown. Similarly, from a cross-checking of the reference characters 23 as they appear in said Figs. 1 and 4, it will be seen that running aft from a transverse plate or wall structure 25 (Figs. 4 and 4a) forward of which is the engine-mounting terminal fender hereinafter described, are illustrated merely eight longérons 23 for the main body 16 of the fuselage and the after-portion 19 of the fuselage.

As shown in Figs. 1 and 4, each of the longérons 23 carries an auxiliary device 26. Each such device, indicated merely diagrammatically in Figs. 1 and 4, is shown in a preferred form in detail in Figs. 2 and 3. The device 26 of Figs. 2 and 3 is a slider device, including a main slider-part 26a of U-form, the legs of the U near their free ends journalling a pair of transverse rollers 26b. With the longéron also of U-form, transversely, as is common, and as illustrated in Figs. 2 and 3, the rollers 26b intermediate their ends may bear against the longéron edges indicated at 23a and so the entire device 26 may snugly hug the longéron all around, and yet in a manner to be readily and easily slid along the length of the longéron. Each longéron being made up of two separate lengths pivoted together as indicated at 23b, it will be clear that the device 26, when positioned on the longéron as illustrated in Figs. 2 and 3, that is, to surround and render inoperative the pivot 23b, acts as one of the braces hereinabove mentioned for holding inoperative any terminal fender incorporated at or near the tail portion of the airplane; provided, as intended here, that the longéron assembly employed is of sufficient strength, with all the longéron pivots locked by their devices 26, to give to the tail of the fuselage the strength and rigidity necessary for safe flying.

Similarly, each of the eight wing-spars 24 of each wing 14 and 15 is formed of two lengths pivoted together, with each such pivot (not shown) normally covered and hence locked by a device 26. These devices 26 on the wing-spars are desirably identical in construction with the device 26 as illustrated in Figs. 2 and 3; and said wing-spars are desirably of the same U-form as the longéron element described and shown in Figs. 2 and 3. Thus, likewise as already described in the case of a terminal fender at the after portion of the fuselage, the devices 26 on the wing-spars act as the braces aforesaid for holding locked or inoperative any terminal fenders incorporated at or near the outer ends of the wings; provided, as intended here also, that the wing-spar assembly employed for each wing is of sufficient strength, with all the pivots of these wing-spars locked by their devices 26, to give to the wing tips the strength and rigidity necessary for safe flying.

It should be clear from what has been said that it is intended that the airplane illustrated in the drawings shall (to give a rather complete example of one way of carrying out the invention) include terminal fenders at the three locations just above described, that is, near the tail of the fuselage, and in both wings at the outer end portions thereof. The fender construction incorporated at each of these three locations may include the sections of the longérons or wing-spars extending beyond the pivot points therein, in combination with the sheathing or skin housing said longéron or wing-spar sections; but desirably such fender construction will include a collection 27 (Fig. 4) of thin, light, elongate, structural strips connected variously with each and with other elements of the airplane structure in the vicinity, and crisscrossing each other in various angularly related planes, and hence shock-absorbingly crushable or crumpleable in practically all directions.

There is still another, or fourth, terminal fender incorporated in the airplane illustrated in the drawings; the object of which is to properly mount the engine and yet protect the front end of the fuselage and particularly the pilot's station against crushing or destruction by the engine in the event of a crash at the nose of the airplane. Referring in this connection to Figs. 1a and 4, there will be noted two sets of four slider devices 26' and 26''. These are the same in function as the devices 26 already described; that is, the devices 26' and 26'' are slidable to cover and uncover as desired pivots in elongate multi-section supporting means for positioning the engine in proper position a certain distance ahead of the front end of the fuselage portion 16. Said pivots are shown at 28 in Fig. 4a. The multi-section supporting members, each of which includes two of such pivots, are four in number, and are indicated in Figs. 1a and 4 at 29. As will be seen from Fig. 4a, each such supporting member 29 includes a post 29a, a post 29b, and an intermediate link 29c. Each post 29a is offset forwardly from the transverse plate or wall structure 25; this wall structure having suitably secured thereto, at say its rear side, the forward ends of the longérons 23. Each post 29b is rearwardly offset from an engine-mounting plate or wall structure 30. These members 29, symmetrically extended between the plate or wall structures 25 and 30 so as to position the engine properly at the front end of the airplane when all the four members 29 are straight elongate structures throughout, as shown in Fig. 4 and (in full lines) in Fig. 4a, are of sufficient strength and rigidity (and not, of course, as diagrammatically shown in Fig. 1a), for safely carrying the engine in flight when the devices 26′ and 26″ cover and lock the pivots 28. Then the devices 26′ and 26″ are arranged as shown in Figs. 4 and 1a. When, simultaneously, the devices 26′ are moved forwardly, and the devices 26″ are moved rearwardly, (from their positions as shown in Fig. 4; compare, the small arrows in Fig. 1a), the pivots 28 are uncovered, and the engine may shift readily relative to the fuselage, and parallelly relative to the wall or plate structure 25 at the front end of the main fuselage body 16,—for instance, upwardly as shown in Fig. 4a in broken lines (as on a nose-smash at a considerable angle of impact, and with the airplane flying right side up or upside down).

These engine-supporting members 29, in combination with the sheathing or skin surrounding the same, may constitute also, as above pointed out, a terminal fender; but, as in the case of the other terminal fenders already described, an additionally shock-absorbingly crushable auxiliary net-work 27 of thin, light elongate elements is shown in Fig. 4 as surrounding or massed about the pivots 28. Note again that while such pivots are hidden in Fig. 4 by the devices 26′ and 26″, the pivots themselves are clearly shown in Fig. 4a—the devices 26′ and 26″, for purposes of simplicity, being entirely omitted here.

It should also be explained, as to all the four terminal fenders described, that the collections 27 of crushable net-work are so arranged that clear-way spaces are provided therein, for the required sliding movements of the devices 26, 26′ and 26″ and the necessary movements of their operating devices.

These operating devices, and their driving means, will now be described. See Figs. 1 and 9.

Passing through a shifted-gear transmission box or casing 30 of any suitable design, is a main driven shaft 31, somewhat offset from the engine shaft 32 and the propeller shaft 33 concentric with the latter. This shaft 31, in that portion thereof extending rearwardly from the casing 30, carries a bevel-gear 34, and, some distance in rear of the latter, a spur-gear 35. By bevel-gear drive throughout, as most clearly shown in Fig. 1, there are operated with the main driven shaft 31 a plurality of shafts 36, 37, 38, 39, 40, 41 and 42, all suitably journalled in manners not shown.

As shown in said Fig. 1, shafts 39, 40 and 42 have threaded portions marked respectively 39′, 40′ and 42′. On these threaded portions are mounted nut structures W, W′ and T, for shifting the devices 26 of the two wing fenders and of the tail fender simultaneously, as the shafts 39, 40 and 42 are simultaneously rotated with the main driven shaft 31. In other words, the parts are so designed that, assuming the devices 26 are all arranged on their wing-spars 24 and longérons 23 to cover and lock the pivots in these elongate elements, rotation of the driven shaft 31 in a certain direction will simultaneously cause the nut structures W and W′ to move inwardly along the wings toward the center line of the fuselage and the nut structure T to move up along the length of the fuselage toward the nose thereof.

Nut structures W and W′ are identical in construction, each comprising a nut-proper 43, a main head-bar 44 carried thereby, and a plurality of more or less vertically arranged forks 45 extended from the head member. The tine element of each fork engages a different one of the devices 26 of the wing-end fenders; so that on simultaneous inward movements of these nut-structures W and W′ toward each other, all the devices 26 of said wing-end fenders are moved up along their wing-spars 24 toward the center of the airplane to uncover and unlock the pivots in said wing-spars normally covered and locked by said devices.

Nut structure T comprises a nut-hub carrying eight radially arranged arms 46, the outer end of each of which arms is link-connected, as indicated at 47, to one of the devices 26 of the tail fender; there being eight of these devices 26, one on each of the longérons 23, as already explained. Thus, all of these last-mentioned devices 26 will be moved in unison up toward the front of the airplane to uncover and unlock the pivots in the longérons 23 normally covered and locked thereby, thus to render operative the tail fender; simultaneously with the last-described movements of the devices 26 on the wing spars 24, to render operative the wing-end fenders.

There are two other nut structures incorporated, located ahead of the casing 30 of Fig. 1, for operation by the main driven shaft 31, simultaneously with the operation of the three nut structures W, W′ and T already described. These nut structures ahead of said casing 30, marked E and M respectively, are shown most clearly in Fig. 1a.

Said nut structures E and M both serve the nose-fender, or, as it has also been called herein, the engine mounting fender; and are identical in construction, except dimensionally and as to the hands of the internal threads in their hub portions, which internal threads respectively engage appropriately laid threads, right and left handed, on the portion of shaft 31 extending forwardly of the casing 31. Thus, as the shaft 31 is turned in one direction or the other, the nut structures E and M (if held against rotation) will move in opposite directions, either toward or away from each other. Each of the nut structures E and M is formed as a spider including four arms integral with the four devices 26' or 26"). The threads of opposite hand on main driven shaft 31 with which nut structures E and M are engaged, are so arranged that when the shaft 31 is turned in the appointed direction to render operative, through shafts 39, 40 and 42, the wing and tail fenders as just above described, said shaft 31 also operates to render operative the nose fender,—in this last case by moving the nut structure M (including the devices 26') forwardly, and the nut structure E (including the devices 26") rearwardly, to uncover the eight pivots 28 (Fig. 4a) of the four engine-supporting members 29.

Figure 5:
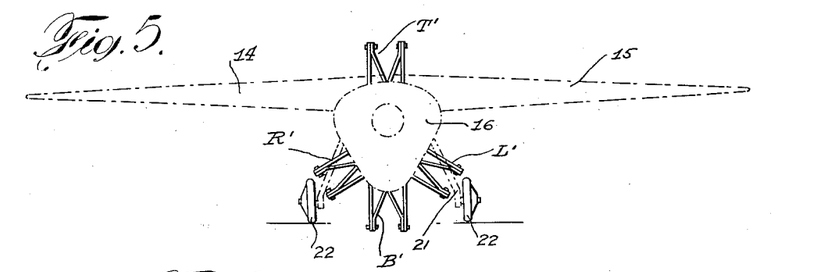
Fig. 5 is a front elevation of the airplane illustrated in Fig. 4, but showing intermediate fenders expanded to project protectingly of the general fuselage body.

In addition to the terminal fenders constructed and operated (at the two wing ends and at the fuselage ends) as already described, there are incorporated four intermediate fenders, the locations of which are indicated in Figs. 4 and 5 at T, B, L and R.

Figure 6:
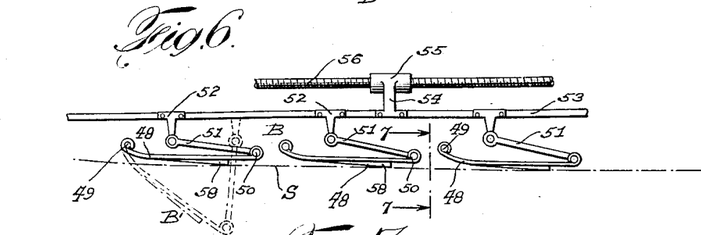
Fig. 6 is an enlarged detail view of certain operative elements of an intermediate fender of the type shown in Fig. 5.
Figure 7:
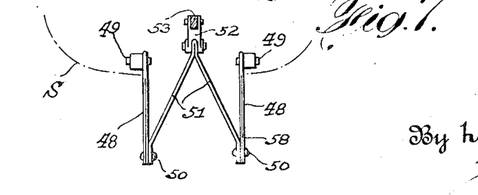
Fig. 7 is a transverse section, taken on line 7—7 of Fig. 6.

Each of these intermediate fenders may be similar in construction; and, that being preferred, Fig. 5 shows at T', B', L' and R' these four fenders expanded or projected well beyond the normal contour of the fuselage to the abnormal condition contemplated for them when an abnormal landing appears inevitable to the pilot; while Figs. 1, 6 and 7 show, as typical of these fenders, details of construction of the bottom fender B.

Referring to this fender B, the same comprises a suitable series of tandem-arranged toggle-sets, each set including a pair of sidewisely-spaced swing-bars 48. Each bar 48 is pivoted at one end, as at 49, to a stud having a suitably rigid support not shown, such support located within the skin or sheathing S of the fuselage. The opposite ends of each such pair of bars 48 are pivotally connected, as at 50, to a V-frame 51; the other or apexed end of which frame is pivotally connected to a hanger 52 secured to a rod 53 hung as at 54 from a plurality of suitably spaced nuts 55 on a threaded shaft 56. Only one of such nuts is shown in Fig. 6, but two are seen in Fig. 1. This shaft 56 carries fixed thereon a spur-gear 57 meshing with the similar gear 35 on main driven shaft 31.

Normally, as will have become evident, all the toggle-sets are collapsed in under the skin S as shown in full lines in Fig. 6. Note in this connection that the swing-bars 48, along their lower edges when the toggle-sets are thus collapsed, carry sharp knife-edge or rip-blade portions, marked 58, just behind said skin S, so shaped that when the entire intermediate fender is expanded and projected as shown in Fig. 5 at B', the skin S is ripped through and stripped clear opposite the fender as an incident to, and to permit, the expansion and projection of said fender.

And it will be seen, the thread of shaft 56 being of the proper hand to bring about that result, that the bottom intermediate fender B is thus expanded and projected, simultaneously with the shifting of the pivot-uncovering devices 26, 26' and 26" to render operative the four terminal fenders; all as the result of the turning of main driven shaft 31 in an intended direction.

Figure 9:
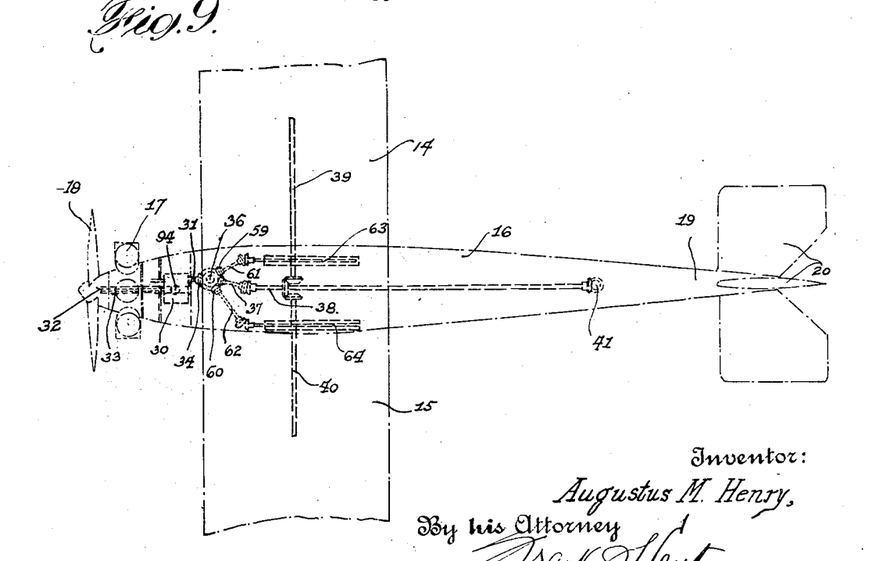
Fig. 9 is a view somewhat similar to Fig. 4 in that it shows the more familiar components of an airplane in dot and dash lines, but chiefly illustrating certain important driving connections from the casing of Fig. 8 to the various fenders.

Comparing Figs. 1, 4 and 9, and pointing out that the top intermediate fender T and the two side intermediate fenders L and R are each operated by its own nuts and threaded shafts corresponding to the nuts 55 and shaft 56, it will be observed, from Fig. 9 especially, that the bevel gear shown in Fig. 1 at the bottom of shaft 36 meshes also with bevel-gears 59 and 60 at the forward ends of a pair of rearwardly inclined shafts 61 and 62. For simplifying Fig. 1, only the former of these shafts 61 and 62 is there shown. Both these shafts, however, as is clear from Fig. 9, carry at their rear ends bevel gears meshing with similar gears fixed on threaded shafts 63 and 64. These threaded shafts correspond to the threaded shaft 56, and said shafts have nuts thereon corresponding to the nuts 55, for operating the toggle-sets (not shown) of the intermediate side fenders R and L. One of the nuts 55' for operating the intermediate top fender T is illustrated in Fig. 1, however, as being operated by shaft 38; such nut engaging the thread 38', of suitable hand, on said shaft 38.

And since the threads of these shafts are of the proper hands to bring about such result, it will be seen that when the main driven shaft 31 is operated in the intended direction, the top and side intermediate fenders T and R and L, as well as the bottom intermediate fenders B, are all expanded and projected, simultaneously with the shifting of the devices 26, 26' and 26" to render operative the four terminal fenders at the wing and fuselage ends.

It will be understood of course that many if not the great majority of the operating and operated instrumentalities so far described are shown in the drawings without any great regard to relative dimensions, either as between themselves, or as between any of them and the more or less familiar structural elements of a present-day airplane, nor has any careful attempt been made properly to differentiate relative dimensions as between said structural elements. What has been kept in mind is the aim to disclose one possible way of carrying out the invention, and the praticable one now most preferred; in the clearest way possible.

Regardless of the design finally adopted, absolutely adequate and dependable flying and taking-off and alighting stresses and strains must be provided for, despite the inclusion of the devices for rendering operative or bringing into action the various emergency fenders already described, when the latter are needed for shock-absorbing crumpling according to the invention. Again it is desirable if not essential that the operating means for said devices should be such that accidental shifting thereof is impossible; hence, the suggested use throughout of nut structures as operating links.

Further, as it is now believed, power means of several alternatively available kinds should be provided as prime movers for the operating means, so that if one of such power means for one reason or another fails when an emergency requires it, another or others will be instantly available. Therefore, the invention contemplates the provision of a plurality of such power means, one or another of which may be employed as the occasion warrants. In the present case, three such power means are illustrated; one, the airplane motor; another, the airplane propeller (used as a power-imparting instrumentality from the relative wind when say the airplane is volplaning due to engine failure); and another, an auxiliary engine operated by compressed air, say from a compressed air-flask carried for the purpose.

Figure 8:
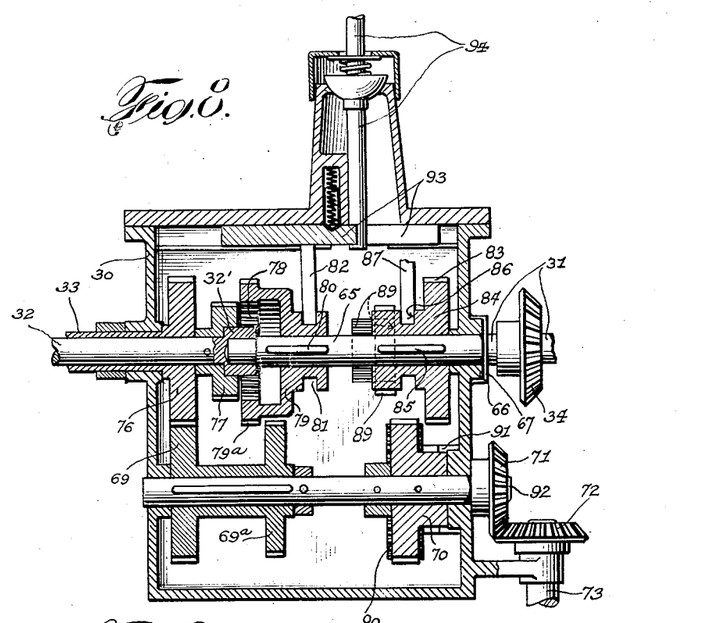
Fig. 8 shows on an enlarged scale certain of the operating parts of Fig. 1, and is in the main a longitudinal vertical section through a gear-shifting mechanism for selecting one of a plurality of power means to set all terminal and intermediate fenders simultaneously to "collision" condition.

Referring now principally to Fig. 8, the casing 30 houses, in addition to a length of the main driven shaft 31, a portion of the engine shaft 32, and, as a sleeve-shaft loose about the matter, a portion of the propeller shaft 33. Engine shaft 32 is cupped at 32' at its end located inside the casing, and within this cup is loosely journalled one end of a shift-gear shaft 65, the other end of which shaft 65 is journalled in a boss 66 on casing 31. This boss 66 is in front of a boss 67 journalling shaft 31, as the parts are viewed in Fig. 8. Also journalled in suitable bosses in casing 31 is a jack-shaft 68. On this shaft 68, inside the casing, are fixed spur-gears 69 and 69a, and a loose spur-gear 70. Beyond the casing, a bevel-gear 71 will be noted, meshing with a bevel-gear 72 on the upper end of a vertical shaft 73 constituting the rotor-shaft of a rotary compressed-air motor (this motor being shown at 74, and its supplying flask at 75, in Fig. 1). The bevel-gear 71 is not on the jack-shaft 68, as may be seen by a close inspection of Fig. 8; but is on an auxiliary shaft described hereinbelow. Formed on the propeller shaft 33 is a spur-gear 76 always in mesh with spur-gear 69; and fixed on the engine shaft 32 is a spur-gear 77. For meshing with this gear 77 when required is an internal gear 78 in a shift-member 79, feathered at 80 on shaft 65, and having a peripheral groove 81 engaged by a shifter-claw 82; this shift-member 79 also carrying an external gear 79a. For meshing with gear 70 on jack-shaft 68 when required is a spur-gear 83 formed on a shift-member 84, feathered at 85 on shaft 65, and having a peripheral groove 86 engaged by a shifter-claw 87. On shaft 31 is a spur-gear 88, of such width as always to be in mesh with a spur-gear 89 also carried by shift-member 84, irrespective of the position to which shift-member 84 is thrown by claw 87, that is, whether said shift-member is located as illustrated or is thrown to cause intermeshing of its gear 83 with the gear 70 on jack-shaft 68. The gear 70, loose on said shaft 68, meshes with another similar gear 90 fixed on an auxiliary shaft (hereinabove referred to briefly in passing); which auxiliary shaft, suitably journalled in the casing 31 as at 91, is not shown except at one extreme end thereof, marked 92—this shaft 92 having also fixed thereon the hereinabove mentioned bevel gear 72 on the air-motor shaft 73.

Claws 82 and 87, together with a shift plate assembly 93, and a manually operated shift-lever 94, all these parts constructed and coacting in a manner familiar in the art of selective shift-gear transmissions such as are employed in motor-cars, serve, according as the lever 94 is moved from the central "neutral" position illustrated in any one of three different ways, to connect as the prime mover for the main driven shaft 31, either the engine shaft 32, the propeller shaft 33, or the air-motor shaft 73; through gear-trains selectively set up, as will now be described.

When, with the parts arranged as shown in Fig. 8, it is desired to drive the main driven shaft 31 from the engine shaft 32, the lever 94 is thrown to shift the shift-member 79 to the left, to cause intermeshing of the gears 77 and 78, and then the main driven shaft 31 is rotated with the shaft 65, through the gears 89 and 88, said shaft 65 rotating with the engine shaft through the gears 77 and 78 now intermeshed as just explained.

When, with the parts arranged as shown in Fig. 8, it is desired to drive the main driven shaft 31 from the propeller shaft 33, the lever 94 is thrown to shift the shift-member 79 to the right, to cause intermeshing of the gears 79a and 69a, and then again the main driven shaft 31 is rotated with the shaft 65 through the gears 89 and 88, said shaft 65 in this instance rotating with the propeller shaft, through the gears 76 and 69, and thence through the gears 69a and 79a now intermeshed as just explained.

When, with the parts arranged as shown in Fig. 8, it is desired to drive the main driven shaft from the air-motor shaft 73, the lever 94 is thrown to shift the shift-member 84 to the left, to cause the gear 85 rotating with shaft 65 to become intermeshed with the gear 70 loose on shaft 68, and then again the main driven shaft 31 is rotated with the shaft 65 through the gears 89 and 88, said shaft 65 in this instance rotating with the air-motor shaft 73, through the gears 72, 71, 90, 70 and 83.

The scope of protection contemplated is, of course, not to be taken from the combinations and arrangements of parts and particular elements hereinabove shown and described as illustrative of one of the many possible ways of carrying out the fundamental concepts involved, or any of them; but solely from the appended claims.

In said claims, whenever reference is made to a "subdivision" of an airplane, there is meant an airfoil subdivision, as a wing portion, or an occupant housing subdivision, such as a fuselage or the portion of the airplane intermediate wing portions where the airplane has the fuselage or equivalent merged more or less smoothly into a wing.

I claim:

1. In an airplane, the combination with a subdivision thereof, said subdivision of the covered, internally braced type; of means including crumpleable elements normally non-crumpleable and normally housed within said cover, and means for at will conditioning said elements thereby to render them elements of a crumpleable fender entity for shock-absorptive deformation when abnormally impacted by another object.

2. In an airplane including a subdivision of the covered, internally braced type, a fender entity normally housed within such cover but adapted to be projected beyond such cover for shock-absorptive crumpling, and means for at will thus projecting said entity when collision of the airplane with another object seems imminent.

3. An airplane including a projectant structural component thereof having a covering and internally braced by fixed elements and adjustable elements, and means for moving said adjustable elements to establish an abnormally weakened projectant structure on the occurrence of an emergency whereby such projectant structure if impacting first may by its resulting distortion act as a shock-absorbing means for an adjacent part of the airplane.

4. An airplane including the combination of an occupant-housing subdivision, an engine ahead of said subdivision, means normally mounting the engine rigidly in place but including adjustable elements, and means for adjusting the last-mentioned elements to adapt the engine for a movement relative to said subdivision on the engine abnormally impacting another object while limiting such engine movement to a path removed from said subdivision.

5. An airplane including the combination of an occupant-housing subdivision, an engine ahead of such subdivision, means normally mounting the engine rigidly in place but including adjustable elements, crumpleable shock absorbing means between the engine and the occupant-housing compartment within said subdivision, and means for adjusting said adjustable elements to free the engine for a movement crushingly of said shock absorbing means.

6. In an airplane, the combination, with a subdivision thereof having a cover and internal bracing for coacting with said cover to give the said subdivision the requisite flying strength with minimization of parasitic resistance, of means within said cover for at will abnormally weakening said bracing at a selected location thereby to make a crumpleable shock absorbing fender of the cover and the so-weakened bracing adjacent to said location.

7. In an airplane, the combination, with a subdivision thereof having a cover and internal bracing for coacting with said cover to give the said subdivision the requisite flying strength with minimization of parasitic resistance, of crushable shock absorbing means within said cover, and means also within said cover for abnormally weakening said bracing at a selected location to make a crumpleable shock absorbing fender of the cover, of the so-weakened bracing and of said shock absorbing means.

8. In an airplane, the combination, with a subdivision thereof having a cover, an internal bracing for coacting with said cover to give the said subdivision the requisite flying strength with minimization of parasitic resistance, said subdivision being so incorporated in the airplane as to include a portion projectant from the airplane and thereby positioned to be struck earlier than another portion of the airplane on a certain abnormal impact of the airplane against another object; of movable means operable to affect said bracing at a location removed from the part of said projection portion thus to be struck at the first instant of such impact, thereby to make a crumpleable shock absorbing fender of the cover and of said bracing from said part back toward said location, and means operable at the will of the pilot for actuating said movable means.

9. In an airplane, the combination, with a subdivision thereof having a cover and internal bracing for coacting with said cover to give the said subdivision the requisite flying strength with minimization of parasitic resistance, said subdivision being so incorporated in the airplane as to include a portion projectant from the airplane and thereby positioned to be struck earlier than another portion of the airplane on a certain abnormal impact of the airplane against another object; of such a construction for said internal bracing that the same incorporates therein means for structurally fortifying said bracing so that by the coaction of said bracing, said cover and said means, said subdivision is rendered non-crumpleable during normal flight of the airplane, and means operable for rendering inoperative the first mentioned means thereby to make a crumpleable shock absorbing fender of the cover and its internal bracing.

10. The airplane defined in claim 1, wherein certain of said crumpleable elements are protrusile elements projected beyond the cover of said subdivision by operation of said means.

11. The airplane defined in claim 1, wherein there are provided auxiliary elements within said cover for normally rendering said crumpleable elements non-crumpleable, said auxiliary elements being movable stiffener elements for said crumpleable elements, and means operable at will to move said stiffener elements to render said crumpleable elements crumpleable.

12. The airplane defined in claim 1, wherein certain of said crumpleable elements are protrusile elements, and wherein there are provided means operable at will for projecting said elements beyond the cover to provide a crumpleable abnormally projectant structure on the airplane.

13. The airplane defined in claim 1, wherein certain of said crumpable elements are protrusile elements, and wherein there are provided means operable at will for projecting said elements beyond the cover to provide a crumpleable abnormally projectant structure on the airplane, there being cover removing means operated also by the means last mentioned for permitting projection of said structure.

14. The airplane defined in claim 1, wherein certain of said crumpleable elements are protrusile elements, and wherein there are provided means operable at will for projecting said elements beyond the cover to provide a crumpleable abnormally projectant structure on the airplane, there being cover ripping means operated also by the means last mentioned for permitting projection of said structure, such ripping means moving with but ahead of said protrusile elements.

15. The airplane defined in claim 1, wherein power means are provided for actuating said means operable at will.

16. The airplane defined in claim 1, wherein means are provided for applying the power of the air plane's motor to said means operable at will, to actuate the latter.

17. The airplane defined in claim 1, wherein means are provided for applying the power of the airplane's propeller when driven by the relative wind, to said means operable at will, to actuate the latter.

18. The airplane defined in claim 1, wherein pneumatic means are provided for actuating said means operable at will.

19. The airplane defined in claim 1, wherein pneumatic means are provided for actuating said means operable at will, said pneumatic means including a reservoir of compressed air and a motor operable by such compressed air.

In testimony whereof I affix my signature.

AUGUSTUS M. HENRY.